US012598339B1

(12) United States Patent
Shen et al.

(10) Patent No.: US 12,598,339 B1
(45) Date of Patent: Apr. 7, 2026

(54) METHODS AND SYSTEMS FOR GENERATING AND PROVIDING PROGRAM GUIDES AND CONTENT

(71) Applicant: Paramount Global, New York, NY (US)

(72) Inventors: Guanxi Shen, Los Angeles, CA (US); Xiaofei Wang, Los Angeles, CA (US); Jamal Salmon, Los Angeles, CA (US); Reeyaz Hamirani, Los Angeles, CA (US); Natalie LaBelle, Los Angeles, CA (US); Robert William Puttkammer, Los Angeles, CA (US)

(73) Assignee: Paramount Global, New York, NY (US)

( * ) Notice: Subject to any disclaimer, the term of this patent is extended or adjusted under 35 U.S.C. 154(b) by 0 days.

(21) Appl. No.: 18/990,763

(22) Filed: Dec. 20, 2024

(51) Int. Cl.
*H04N 21/231* (2011.01)
*H04N 21/2385* (2011.01)

(52) U.S. Cl.
CPC ... *H04N 21/2385* (2013.01); *H04N 21/23103* (2013.01)

(58) Field of Classification Search
None
See application file for complete search history.

(56) References Cited

U.S. PATENT DOCUMENTS 5,550,577 A * 8/1996 Verbiest ............. H04N 7/17336
348/E7.075
6,128,467 A * 10/2000 Rege .................. H04N 21/2182
709/219

6,925,499 B1 * 8/2005 Chen ................... H04L 67/1001
709/213
7,895,227 B1 * 2/2011 Henderson ............. G06Q 30/02
709/224
8,924,379 B1 * 12/2014 Kim ...................... G06F 16/334
707/727
9,336,311 B1 * 5/2016 Amarilio ............. G06F 16/9535
2003/0005457 A1 * 1/2003 Faibish .............. H04N 21/2225
711/100

(Continued)

FOREIGN PATENT DOCUMENTS

CA 2699669 A1 * 3/2009 .......... H04L 65/403
CA 2703430 A1 * 4/2009 .......... G06F 16/953

(Continued)

*Primary Examiner* — William J Kim
(74) *Attorney, Agent, or Firm* — Knobbe, Martens, Olson & Bear LLP

(57) ABSTRACT

Methods and systems are configured to deploy additional network computer resources in response to a predicted increase in streaming of one or more items of content. Searches related to an entity are monitored. A first baseline with a quantity of searches for the entity over given time periods is determined. A search peak is detected. A second baseline with respect to a quantity of searches for the entity after the detected spike. A determination is made as to whether the second baseline is greater than a threshold difference from the first baseline, and if so a change in interest that has occurred with respect to the entity is determined. In response to determining that the change in interest has occurred, a deployment of computer resources is performed, comprising a change in a number of streaming servers used to stream content related to the entity.

21 Claims, 4 Drawing Sheets

(56)                    References Cited

U.S. PATENT DOCUMENTS

| | | | |
|---|---|---|---|
| 2003/0224344 A1 | 12/2003 | Shamir et al. | |
| 2004/0010588 A1* | 1/2004 | Slater | H04N 21/23103 |
| | | | 725/98 |
| 2004/0064832 A1* | 4/2004 | Tsukidate | H04N 7/17354 |
| | | | 348/E7.075 |
| 2006/0026658 A1* | 2/2006 | Verhaegh | H04N 21/2407 |
| | | | 348/E7.071 |
| 2006/0167825 A1 | 7/2006 | Sayal | |
| 2007/0245371 A1* | 10/2007 | Quinard | H04N 21/6582 |
| | | | 725/78 |
| 2008/0148317 A1* | 6/2008 | Opaluch | H04N 21/4755 |
| | | | 725/46 |
| 2008/0221974 A1 | 9/2008 | Gilgur et al. | |
| 2008/0222106 A1* | 9/2008 | Rao | H04N 21/44204 |
| 2009/0113482 A1* | 4/2009 | Kawada | H04H 60/31 |
| | | | 725/46 |
| 2009/0144777 A1* | 6/2009 | Mikami | H04N 21/4532 |
| | | | 725/50 |
| 2009/0150214 A1* | 6/2009 | Mohan | G06Q 30/02 |
| | | | 705/14.54 |
| 2009/0182790 A1* | 7/2009 | Hluchyj | H04N 21/2182 |
| | | | 710/33 |
| 2009/0299855 A1* | 12/2009 | Li | G06Q 30/0267 |
| | | | 705/14.54 |
| 2010/0031300 A1* | 2/2010 | Ryu | H04N 21/472 |
| | | | 725/87 |
| 2011/0276679 A1* | 11/2011 | Newton | H04N 21/23103 |
| | | | 709/224 |
| 2012/0030018 A1* | 2/2012 | Passmore | G06Q 30/02 |
| | | | 707/754 |
| 2012/0150907 A1* | 6/2012 | Chowdhury | H04N 21/8549 |
| | | | 707/769 |
| 2014/0214883 A1* | 7/2014 | Sanderson | G06F 16/245 |
| | | | 707/769 |
| 2015/0227517 A1* | 8/2015 | Lymberopoulos | G06F 16/172 |
| | | | 707/706 |
| 2015/0278355 A1* | 10/2015 | Hassanpour | G06F 16/951 |
| | | | 707/706 |
| 2015/0356101 A1* | 12/2015 | Cohen | G06F 16/9536 |
| | | | 707/722 |
| 2017/0249649 A1 | 8/2017 | Garvey et al. | |
| 2018/0211169 A1* | 7/2018 | Rachakonda | G06F 16/951 |
| 2020/0218965 A1 | 7/2020 | Sankaralingam et al. | |
| 2020/0257943 A1 | 8/2020 | Huber et al. | |
| 2021/0064689 A1 | 3/2021 | Cheng et al. | |
| 2023/0229692 A1* | 7/2023 | Goswami | G06F 16/338 |
| | | | 707/723 |

FOREIGN PATENT DOCUMENTS

| | | | | | |
|---|---|---|---|---|---|
| CN | 102207953 A | * | 10/2011 | | G06F 16/78 |
| CN | 112054864 A | * | 12/2020 | | H04N 21/44224 |
| CN | 116866426 A | * | 10/2023 | | H04L 67/55 |
| EP | 0726535 B1 | * | 5/2003 | | H04N 21/4331 |
| JP | 2015179472 A | * | 10/2015 | | |
| KR | 20220019576 A | * | 2/2022 | | G06F 16/3328 |
| WO | WO-0072517 A1 | * | 11/2000 | | H04L 65/612 |
| WO | WO-2024153480 A1 | * | 7/2024 | | G05B 23/0281 |

* cited by examiner

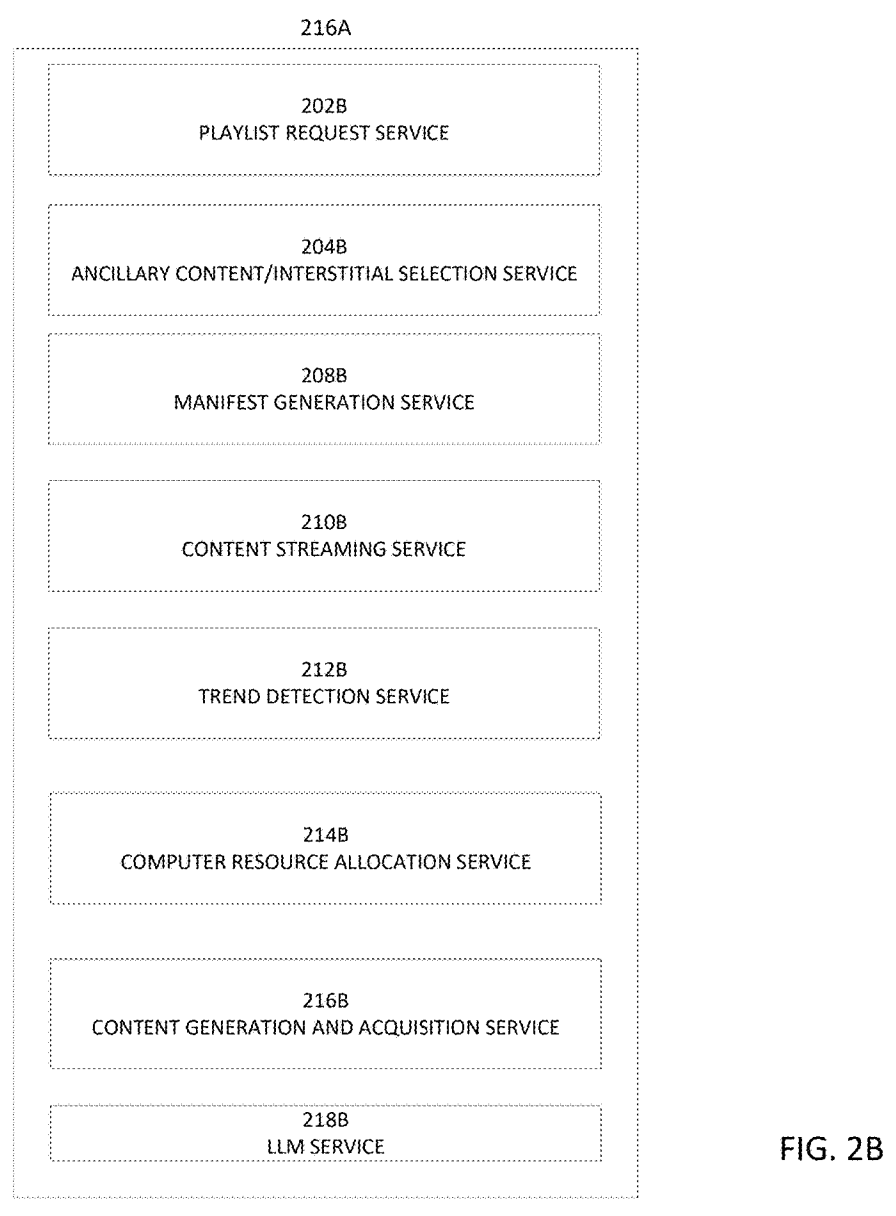

216A

202B
PLAYLIST REQUEST SERVICE

204B
ANCILLARY CONTENT/INTERSTITIAL SELECTION SERVICE

208B
MANIFEST GENERATION SERVICE

210B
CONTENT STREAMING SERVICE

212B
TREND DETECTION SERVICE

214B
COMPUTER RESOURCE ALLOCATION SERVICE

216B
CONTENT GENERATION AND ACQUISITION SERVICE

218B
LLM SERVICE

FIG. 2B

312
SLOPE DETERMINATION

314
OUTPUT SLOPE AND P-VALUE

314
OUTPUT SLOPE AND P-VALUE

316
DEPLOY / UTILIZE LLM TO IDENTIFY SPIKE CAUSES

302
DEVIATION DETERMINATION AND THRESHOLD INITIATION

304
SPIKE DETECTION

306
RESET BENCHMARK THRESHOLDS

308
BASELINE PERIOD DETERMINATION

310
HYPOTHESES TESTING

1

METHODS AND SYSTEMS FOR GENERATING AND PROVIDING PROGRAM GUIDES AND CONTENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND

Field of the Invention

The present invention is related to the distribution of streaming video content over a network.

Description of the Related Art

Streaming video services have become an essential form of content consumption. However, disadvantageously, certain content may become unexpectedly popular, thereby loading and having an adverse effect on the video streaming system.

For example, when a large number of users try to access the same video simultaneously, the streaming service's servers may become overwhelmed, leading to buffering, delayed start times, or degraded video quality. Furthermore, streaming services typically rely on Content Distribution Networks (CDNs) to distribute content from servers located around the world. During peak demand, where a given item of content may be requested from large numbers of client devices, the servers closest to the user can become overloaded, causing delays. If the CDN network is overburdened, content might take longer to load, or users might experience frequent buffering.

To prevent loading issues, many services use adaptive bitrate streaming to adjust the quality of the stream based on the available bandwidth. During high demand, the streamlining service may reduce the video quality automatically to maintain smooth playback. Disadvantageously, this may result in a lower resolution or visual artifacts.

BRIEF DESCRIPTION OF THE DRAWINGS

FIG. 2B illustrates example modules and services.

Figure 1:
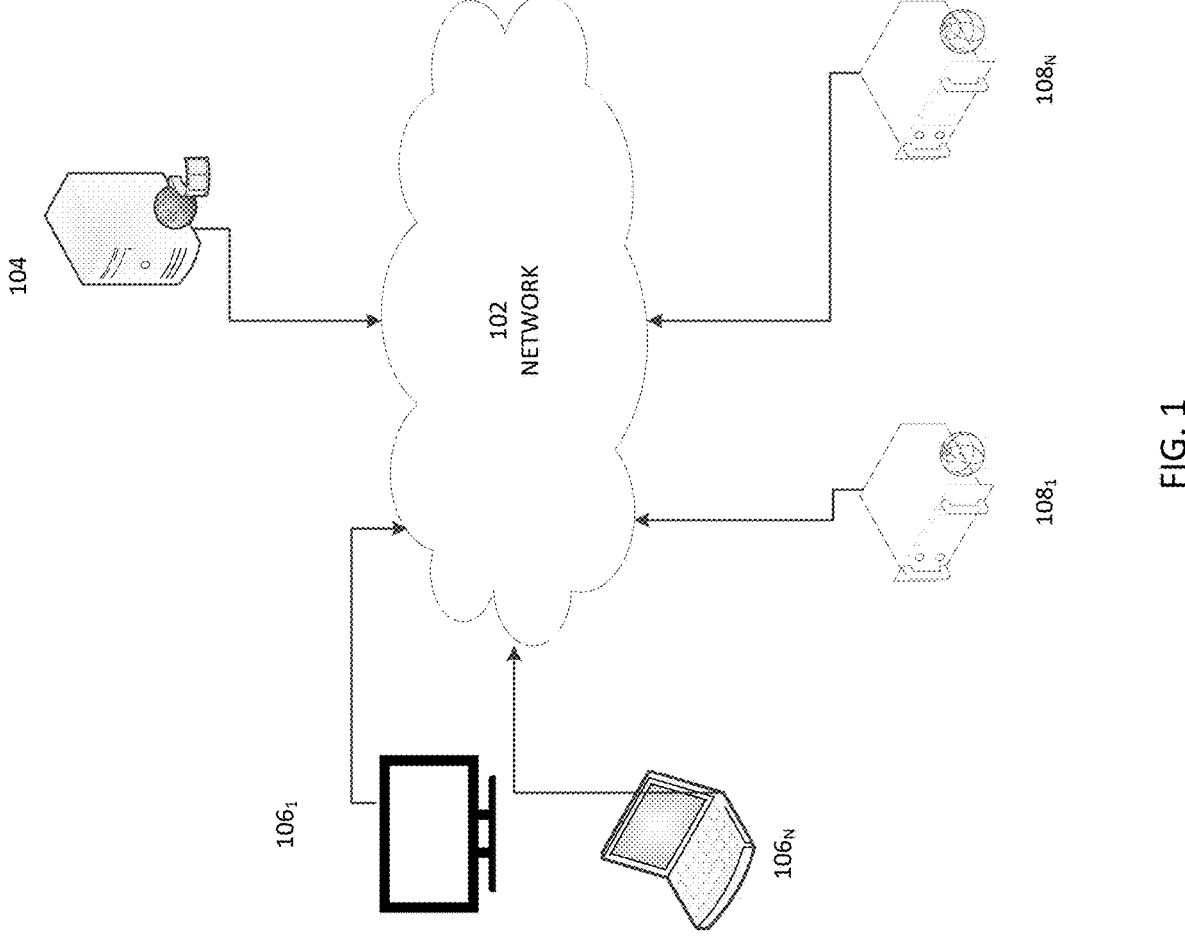
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Systems and methods described herein overcome some or all of the noted technical deficiencies of conventional streaming resource allocation. Described herein are techniques for an adaptive algorithm configured to detect baselines and spikes in trend data, and to identify rising entities in search, viewing and similar trend data. Stable popularity norms are advantageously distinguished from volatile spike periods and statistical testing may be utilized to identify and track chronological increases in viewing/searching baselines. Such trend data may be utilized to predict viewership, and streaming resources may be allocated accordingly.

As similarly discussed elsewhere herein, when a large number of users try to access the same streaming video simultaneously, the streaming service's servers may become overwhelmed, leading to buffering, delayed start times, and/or degraded video quality. Furthermore, streaming services typically rely on Content Distribution Networks (CDNs) to distribute content from servers located around the world. During peak demand, where a given item of content may be requested from large numbers of client devices, the servers closest to the user can become overloaded, causing delays. If the CDN network is overloaded, content might take longer to load, or users might experience frequent buffering.

To prevent loading issues, many services use adaptive bitrate streaming to adjust the quality of the stream based on the available bandwidth. During high demand, the streaming service may reduce the video quality automatically to maintain smooth playback. Disadvantageously, this may result in a lower resolution or visual artifacts.

Conventional approaches to detect trends are inadequate. For example, search data often includes volatile spike periods triggered by temporary events that cause a surge in public interest and searches. These spikes are typically short-lived and topical, making it inaccurate to infer that they represent a genuine rise in popularity. Instead, such spikes introduce noise into the data, complicating the process of building reliable time series models. Additionally, some events might temporarily increase search activity without contributing to a lasting positive impact in baseline popularity, further obscuring true popularity trends. The foregoing presents technical challenges in determining long lasting trends, and in accordingly deploying adequate computer resources for streaming content and in determining what content should be created and/or acquired Thus conventional techniques fail to adequately differentiate between temporary search and/or streaming spikes and the more stable baseline periods that better represent the norm of an entity's popularity. This makes it difficult to predict viewership for content, and hence makes it difficult to address the technical challenges of adequately deploying computer resources and determining what content should be created and/or acquired.

Therefore, it would be advantageous to provide technical solutions to the foregoing technical challenges so that it would be possible to accurately detect search, popularity, and viewing trends (e.g., of actors/talent, franchises, brands, particular items of content, categories of content, and/or the like) while filtering out spikes, and make viewer demand, resource demand, ticket demand (e.g., for theatrical releases of movies or other content) and/or other predictions using such viewing trends.

Such detection of search, popularity, and viewing trends (where popularity may optionally be based on search trends, viewing trends, and/or other trends) enables the allocation and/or acquisition of assets to address such trends and corresponding predicted viewing. For example, more streaming servers may be allocated to stream a new movie with an actor or that is part of a franchise for which there is a trend of increasing interest (e.g., as determined via relevant search queries) and viewership. By way of further example, when a determination is made that an actor (e.g., an emerging actor) is trending upwards (e.g., the number of viewers that search for information on the actor and/or view content with the actor is increasing over time) additional content with the actor may be created and/or acquired (e.g., for streaming and/or theatrical release). By way of additional example, more product-related assets may be allocated for movie production and/or distribution for movies that include a given actor when a determination is made that the actor is trending upwards.

The trend information (e.g., based on searches, views, ticket sales, and/or the like) regarding a franchise may be utilized to determine the franchise health (e.g., is interest in the franchise trending upwards or downwards), to determine whether greater or fewer resources should be assigned to the franchise (e.g., intellectual property acquisition, production, marketing, distribution resources, reactivation of a franchise, and/or the like).

By way of further additional example, when a determination is made that an actor/talent (e.g., performers, optionally including animals or animated characters), brand, or franchise is trending, content associated with the actor/talent, brand or franchise may be provided with a relatively more prominent position on a streaming service home/library page (e.g., in a recommended content category, a watch next category, a popular category, and/or the like) so that a viewer will more quickly see that the content is available for streaming (without having to navigate through multiple screens) and is more likely to stream the content. On the other hand, if a determination is made that an actor is trending downwards (e.g., the number of viewers that view content with the actor is decreasing over time and/or the number of viewer searches regarding the actor is decreasing over time) less content with the actor may be created and/or acquired. By way of further additional example, when a determination is made that an actor/talent, franchise, or brand is trending downwards, content associated with the actor, franchise, or brand may be provided with a relatively less prominent position on a streaming service site (e.g., where the user may have to scroll or otherwise navigate through multiple pages of content before being presented with the corresponding content or may have to utilize a search engine to locate such content).

When detecting such search trends and/or viewing trends it would also be advantageous to filter out "noise" (e.g., temporary, volatile spikes in viewership or viewer interest in a given actor, program series, movie, franchise, brand, and/or the like) so that the allocation of computer resources and/or the creation, acquisition, and distribution (e.g., via a streaming platform and/or via theatrical release) of content with a given actor, franchise, or brand is not significantly based on temporary spikes.

Optionally, an enhanced version of CUSUM (Cumulative Sum Control Chart) may be utilized to detect trends such as those described herein. CUSUM is a statistical technique that advantageously may be utilized to detect small shifts in data trends over time. As described herein, an adapted, enhanced CUSUM algorithm tracks the cumulative deviation of search data from its norm, represented by either the mean or median of a given period. The deviation at each time point is calculated as the difference between the search data at that point and the norm. The algorithm then accumulates these deviations over time to pinpoint moments when the search pattern shifts significantly away from the norm.

Thus, for example, CUSUM may be utilized to identify gradual changes or persistent trends (e.g., significant increases or decreases in an actor's, content item's, franchise's, and/or brand's popularity) by analyzing cumulative deviations from a target mean. The enhanced CUSUM is sensitive to small, consistent changes, which enables it to detect shifts in popularity that may not be immediately apparent. By focusing on cumulative deviations, CUSUM filters out short-term noise, giving a clearer picture of sustained popularity, viewing, and/or search trends.

In particular, CUSUM calculates the cumulative sum of deviations from a specified average or target value. Optionally, one-sided or two-sided CUSUM algorithms may be utilized. One-sided CUSUM detects only upward or only downward trends. Two-sided CUSUM detects both upward and downward trends, enabling it to be used to identify both increases and decreases in viewership and/or ticket sales of a particular item of content, series, franchise, brands, and/or actor. In both cases, a given point in the CUSUM series may be based on the cumulative sum of the differences between observed values and a reference value or baseline (e.g., historical average viewership).

For example, baseline periods may be relatively stable search periods when there are no significant events triggering temporary surges and thus reflect the true underlying normal level of popularity, free from the noise introduced by short-term spikes, and the baseline period may provide insights on the changes of popularity before and after the spike events. Detecting these baselines within the search data and/or content streaming data is helpful for understanding whether an entity (e.g., an actor, franchise, brand, or the like) is genuinely rising in popularity. A technical challenge is to accurately identify baseline periods to distinguish real popularity norms from the noise of temporary spikes. Conventional techniques are inadequate to accurately detect baseline periods and trends in search data and/or viewing data.

With respect to search activity, the baselines provide an enhanced metric for underlying popularity because such baselines may represent spontaneous, unprompted search activities in inactive periods, not impacted by exogenous factors. Different types of events may affect baselines in different ways. By contrast, event-triggered search spikes may only be temporal, without long lasting impact. For example, positive career related events might have a long-lasting positive effect on the baseline after the spikes. The resulting baseline would appear higher than the baseline before a spike with such positive influences. Some events (e.g., a new interview with or photo of an actor), although potentially triggering intensive public interest (which would appear as a spike), do not result in raising the popularity norm over the long term. Thus, as described herein, the determination as to whether an entity is rising (has an increasing trend in baselines) may be made using hypothesis testing and through the use of statistical methods to test chronologically monotonic increases in baselines.

An example of the application of CUSUM to viewership/ popularity trends for an actor/talent will now be described. It is understood that a similar process may be used to detect viewership/popularity trends for brands, franchises, series, items of content, and/or the like. Such viewership trends may be utilized in determining casting, initiating content production (e.g., based on the associated casting of actors), identifying advantageous partnerships, and/or determining deployment of marketing resources The first example will describe detecting trends based on content views, and the second example will describe detecting trends based on entity search data. It is understood that similar techniques may be utilized to detect trends based on ticket sales of theatrical releases of movies or other content, and such detected trends may be utilized in determining casting, initiating content production, and determining deployment of marketing resources.

A viewership/popularity baseline may be determined. For example, the average viewership for content involving the actor over a given period (e.g., weekly, monthly or quarterly averages) may be determined. For a given new data point (e.g., viewership of newly available streaming content involving the actor), the deviation from the baseline may be calculated.

The deviation from the baseline in CUSUM may be calculated by taking the difference between the observed value at a given time point and a reference value or baseline (e.g., the historical average or mean).

$$d_t = x_1 - \mu_0$$

where: $x_1 =$ is the observed viewership at time t, and
where $\mu_0 =$ the baseline viewership (e.g., the historical average viewership over a specific period or the expected/target viewership)

The deviations are then accumulated to generate a cumulative sum of these deviations.

For each time period t, the cumulative sum $S_t$ may be calculated as:

$$S_t = S_{t-1} + d_t$$

Thus, a given $S_t$ point incorporates the deviations from previous points, building up a cumulative trend over time.

Optionally, to track increases and decreases in popularity/ viewership separately, two cumulative sums may be utilized as follows:

Positive CUSUM ($S_t^+$): Tracks upward shifts/trends by adding positive deviations and resetting to zero if deviations go negative.

Negative CUSUM ($S_t^-$): Tracks downward shifts/trends by adding negative deviations and resetting to zero if deviations go positive.

Dynamic baseline resetting may be performed to enhance the CUSUM process. A conventional CUSUM algorithm uses fixed baselines represented by the mean or median of the data, with thresholds based on standard deviation. The standard deviation provides a measure of how dispersed the data is in relation to the mean. For example, a low/small standard deviation indicates data are clustered tightly around the mean, while high/large standard deviation indicates data are more spread out. Recognizing that data patterns can change after spikes, the disclosed enhanced CUSUM algorithm dynamically resets the baseline benchmarks and distribution-based thresholds after respective detected change periods. For example, the thresholds may optionally comprise k and h thresholds, where k may be a reference value (e.g., specified in sigma units) corresponding to the size of the shift to be detected, and where h is a decision limit (e.g., specified in sigma units) corresponding to the number of standard deviations between the center line and the decision limit. Such dynamic resetting of the baseline makes the algorithm more responsive to shifts in the underlying baseline and distribution, ensuring ongoing accuracy. Optionally, benchmark thresholds are reset via dynamic baseline resetting, wherein a change is detected, parameters are reset based on the new baseline established after the detected change. This adjustment improves the performance of the enhanced CUSUM algorithm.

Upper and/or lower thresholds may be specified to detect significant upward and/or downward popularity/viewing changes respectively. When the cumulative sum is determined to exceed these thresholds, it suggests a meaningful upward or downward trend in viewership. Optionally, a threshold may be set based on a multiple of the standard deviation of the data over a period, wherein the standard deviation is a measure of the amount of variation of the values of a variable about its mean. The mean is a numeric quantity representing the "center" of a collection of numbers and is intermediate to the extreme values of the set of numbers. For example, the mean of a set of numbers in a data set is obtained by summing the numbers in the data set and then dividing the sum by the size of the data set. The threshold thus acts as a distribution-based benchmark (e.g., a reference value derived from the statistical distribution of a dataset). Unlike simple averages or medians, which summarize central tendencies, the distribution-based benchmark considers the range and shape of the data distribution, providing a more nuanced point of comparison for individual data points.

By way of illustrative example, suppose the baseline monthly viewership po for an actor's content is 100,000 views. For a given month with an actual viewership of 120,000, the deviation d would be:

$$d = 120,000 - 100,000 = 20,000$$

If this value is then added to the cumulative sum from the previous month, the trend will emerge over time. If the cumulative sum is consistently positive and growing, surpassing a corresponding upper threshold, it indicates a start of a spike period. Then, when the negative CUSUM reaches the bottom threshold, it is identified as the end of the spike period. As discussed elsewhere herein, such spike periods may be merely temporal fluctuation (e.g., caused by short term events that do not affect popularity in a sustained manner) that may be treated as noise. Such spike periods are distinguished from the true underlying popularity norm as reflected in the baselines which indicate true popularity, agnostic of temporal spikes caused by short term events. Example determination of such baselines are described herein Thus, using CUSUM as disclosed herein, gradual shifts in viewership trends may be detected and optionally visualized (e.g., via a generated graph), highlighting whether an actor's, brand's, or franchise's popularity is consistently growing or declining based on deviations from their historical average. CUSUM as described herein enables persistent trends to be identified rather than isolated spikes, thereby accurately identifying an actor's sustained popularity over time.

As similarly discussed above, in addition to or instead of detecting trends based at least in part on viewing patterns, CUSUM may be utilized to detect popularity trends based on search queries (e.g., with respect to actors, brands, franchises, series, items of content, and/or the like).

For example, CUSUM (Cumulative Sum Control Chart) can be effectively used to detect shifts in an actor's (or brand's or franchise's) popularity based on search query volume by highlighting sustained increases or decreases in search interest over time. The historical average of search volumes (e.g., weekly or monthly) related to an actor (or brand or franchise) may be determined and set as the baseline value, Jo. To better capture recent trends, optionally a rolling average may be used for the baseline, wherein the rolling average may be updated periodically (e.g., every month).

For each time period t, the difference between the actual search volume $x_t$ and the baseline $\mu_0$ may be calculated as follows $$d_t = x_t - \mu_0$$

This deviation indicates how much the search volume at time tis above or below the baseline. Positive deviations indicate more interest than usual, while negative deviations indicate less interest.

The cumulative sum of deviations $S_t$ may be calculated to detect a trend as follows:

$$S_t = S_{t-1} + d_t$$

For each time step, the cumulative sum $S_t$ accumulates changes over time. A sustained increase in the CUSUM indicates an upward trend in search popularity, while a decrease indicates a decline in search popularity.

Optionally, as similarly discussed above, CUSUMs can be separately calculated for upward and downward search trends to track increases and decreases independently:

Positive CUSUM ($S_t^+$): Tracks upward shifts/trends by adding positive deviations and resetting to zero if deviations go negative.

Negative CUSUM ($S_t^-$): Tracks downward shifts/trends by adding negative deviations and resetting to zero if deviations go positive.

Upper and/or lower thresholds may be specified to detect significant upward and/or downward popularity/search changes respectively. When the cumulative sum is determined to exceed these thresholds, it suggests a meaningful upward or downward trend in searches/popularity. Optionally, a threshold may be set based on a multiple of the standard deviation of the data over a period, wherein the standard deviation is a measure of the amount of variation of the values of a variable about its mean.

As similarly described above with respect to determining viewing trends, if the cumulative sum is consistently positive and growing, surpassing a corresponding upper threshold, it indicates a start of a spike period. Then, when the negative CUSUM reaches the bottom threshold, it is identified as the end of the spike period. As discussed elsewhere herein, such spike periods may be merely temporal fluctuation (e.g., caused by short term events that do not affect popularity in a sustained manner) that may be treated as noise. As discussed above, such spike periods are distinguished from the true underlying popularity norm as reflected in the baselines which indicate true, long term changes popularity, agnostic of temporal spikes caused by events. A sustained drop below the baseline would suggest a waning interest (e.g., in an actor, program, franchise, and/or the like), potentially due to decreased media presence or fewer new releases, while a sustained elevation about the baseline indicates an increases interest.

Thus, advantageously, by performing bi-directional tracking, deviations in both positive and negative directions are tracked. A spike period may be identified when the spike starts with a positive deviation followed by a negative adjustment. Thus, the disclosed technique optionally includes a negative CUSUM that identifies a negative change when the cumulative deviation drops below a set threshold. This ensures accurate detection of both the start and end of spike periods.

Advantageously, context-specific tracking is performed for searches. In particular, in search trends, a negative drop usually follows a positive spike rather than occurring independently as may be the case with other types of data (e.g., stock price trends). Therefore, optionally, the disclosed enhanced CUSUM algorithm tracks negative changes only after a positive change has been detected, making it more relevant and precise for the search context. Further, by not tracking negative changes when a positive change has not been detected, the utilization of computer resources (e.g., processing bandwidth, memory, etc.) is advantageously reduced.

Optionally, any change/spike period currently in progress without an ending point is dropped. This ensures only complete and accurate periods are considered, enhancing reliability.

Optionally, if a change/spike period is determined to be too flat, indicated by significantly low variance below a set threshold (e.g., a fraction of the overall standard deviation), it is dropped. This prevents insignificant changes from affecting the analysis.

Optionally, baseline periods with a sample size below a minimum required threshold number of values are dropped. This ensures that only statistically reliable baseline periods are considered for hypothesis testing.

By way of illustrative example, if monthly search data for an actor (or other entity) is accessed, and the baseline average monthly searches is 100,000:

For January, searches are 120,000, so $d_t$=120,000–100,000=+20,000.

For February, searches drop to 90,000, so $d_t$=90,000–100,000=–10,000.

These deviations may be accumulated month-to-month. As similarly discussed elsewhere herein, a statistical analysis may be performed to determine whether such changes in search numbers are temporary spikes (e.g., which may reflect a short term event, such as the publication of an interview, and do not indicate a sustained change in search volume), or reflect a sustained change in a baseline number of monthly searches. Such statistical analysis may be utilized to test chronologically monotonic increases in baselines.

A positive increase in the baseline after a spike is detected may indicate that the actor is gaining popularity due to new projects, while a negative trend in the baseline might indicate a decrease in relevance.

Thus, CUSUM may be utilized to monitor and respond to trends in an actor's popularity based on search query volume, enabling data-driven decisions for deployment of streaming resources, promotions, marketing, engagement strategies, greenlighting content production, distribution, engagement with relatively new, emerging actors, and/or project planning. Such identified trends for an entity may be used to predict future viewership of content related to the entity (e.g., by assuming that the viewing trend will linearly increase, will linearly increase times a multiple, will logarithmically increase, and/or the like).

For example, future viewership for a new movie in a franchise may be predicted using a time series analysis. By way of illustration, optionally ARIMA (Auto-Regressive Integrated Moving Average) or exponential smoothing, may be utilized to forecast viewership and/or ticket purchases (e.g., for theatrical releases of a movie) based on trends identified via the enhanced CUSUM algorithm. By way of further example, machine learning models (e.g., Random Forests or neural networks) may incorporate a range of variables (e.g. trend data determined using the enhanced CUSUM, reviews, social media sentiment and/or the like), to predict viewership.

Optionally, as discussed elsewhere herein, in response to a predicted increase in popularity of an actor, brand, franchise, or item of content, new content with such actor, or of the same brand, or of the same franchise, may be generated or obtained. In addition, as described herein, additional streaming computer resources may be deployed to handle predicted increases in viewership for certain content.

With respect to the streaming infrastructure, to handle predicted increases in load (e.g., wherein such prediction may be made using the enhanced CUSUM trend analysis as described herein), horizontal scaling may be automatically performed, which may include adding additional servers or CDNs to distribute traffic effectively.

Additional servers or CDNs may be integrated to manage the anticipated demand using one or more of the techniques described herein.

Dynamic load balancing may be utilized, wherein load balancers are added to distribute user traffic across multiple servers, preventing any single server from becoming a bottleneck. An auto-scaling service may be utilized that automatically spins up additional server instances in response to increased demand, and scales down when the load decreases. This enables surges in viewership to be handled without requiring manual intervention.

If viewership increases are anticipated in specific regions, geo-distributed load balancers may be utilized, wherein regional load balancers are instantiated to manage traffic locally, which improves speed and reduces latency for users in those areas.

Content Delivery Network (CDN) coverage may be expanded to handle predicted increases in streaming demand for an actor, franchise, brand, and/or the like. For example, preemptive caching and geographical distribution may be utilized, wherein additional CDN nodes are added closer to expected high-demand areas, caching the content on servers closer to end users. This reduces latency and distributes the load away from the origin servers.

A multi-CDN strategy may be utilized, wherein multiple CDN providers may be used to provide CDN services, and the streaming load is balanced across them. This provides redundancy and the flexibility to switch between providers based on performance and cost.

Traffic shaping may be utilized, wherein in response to predicted heavy load times (e.g., for predicted high demand content, wherein the prediction is based at least in part on the enhanced CUSUM trend analysis) policies may be set that prioritize or delay certain requests to ensure smoother overall performance.

Optionally, during peak load times, excess traffic may be automatically shifted to cloud resources. This provides flexibility to scale resources up without needing to maintain an extensive, always-on infrastructure.

Optionally, by combining load balancers, CDNs, auto-scaling cloud infrastructure, and/or predictive caching, the streaming service can dynamically manage predicted load increases (e.g., predicted using enhanced CUSUM as described herein), ensuring high-quality performance and reducing the risk of outages or buffering for end users.

Certain additional aspects will now be described with reference to the figures.

FIG. 1 illustrates an example environment. A streaming system 104 (which may include a stitcher component, such as a server, providing stitcher services or where a stitcher system may include a content composer component, or where the content composer and the stitcher may be independent systems) is connected to a network 102. The streaming system 104 is configured to communicate with client devices 1061 . . . 106n (e.g., associated with users of a streaming service) that comprise video players. By way of example, the video player may be embedded in a webpage, may be a dedicated video player application, or may be part of a larger app (e.g., a game application, a word processing application, etc.). The video player may be configured to play video and/or audio content, including primary content and ancillary content. For example, the streaming system 104 may receive a request for media from a given client device 106 in the form of a request for a playlist manifest or updates to a playlist manifest.

The streaming system 104 may host a search system that enables a user to search for streaming content (e.g., movies, series, programs, sporting events, and/or the like). For example, the streaming system 104 may provide a search user interface to a given client device via which the user can enter search terms (e.g., movie names, program names, actor names, director names, genre names, languages, and/or the like). A search engine may then search for content that has associated metadata (e.g., manually entered and/or automatically generated tags that may include the content name, actor names, genre name, language, and/or the like) and present search result.

By way of example, indexing may be performed for video content to ensure that video content appears in relevant search results. Video indexing may comprise processing video files and/or their associated metadata to make the content searchable and accessible on search engines or video platforms. The indexing process may include automated metadata extraction, wherein an indexing process extracts metadata (e.g., title, description, tags, duration, actors, and/or the like) to understand and index the basic attributes of the video. This metadata may be utilized by the search engine to categorize and rank videos in search results. Optionally, transcripts and/or closed captions (e.g., generated via a search-to-text application) associated with a given video are also analyzed to incorporate spoken content into the index.

Optionally, an automated speech recognition engine is used to generate text transcripts, which are then indexed as keywords for search. This enables the search engines to match user queries to spoken content within the video.

A machine learning model (e.g., a neural network-based model comprising an input layer, one or more fully connected convolutional layers, one or more ReLu layers (rectified linear unit, is a non-linear activation function) and/or other activation layers, and an output player) may be utilized to analyze content from video frames to recognize objects, faces, scenes, and text within the video and generate corresponding descriptive metadata that is stored in association with the corresponding video.

Natural Language Processing (NLP) techniques may be utilized to analyze the video transcript/closed captions and any metadata to extract entities, topics, or keywords, which may be associated with the video as additional metadata. This enables indexing content at a more granular level, making it possible to understand context within the video.

The video content may be periodically re-indexed to ensure the metadata is updated to include metadata for new videos and to capture changes in metadata of previously indexed video content.

Optionally, as users engage with the video (through watch times, likes, shares, and/or the like), these metrics may be used by the search engine to update and adjust the video's ranking in search results.

Thus, by actively indexing video content, the search engine is enabled to retrieve specific videos in response to user queries. Indexing also enables videos to be accurately ranked.

Search queries may be stored and later accessed for analysis using the enhanced CUSUM algorithm to detect trends as described herein.

The streaming system 104 may identify, from a file, the location and length of an ancillary content pod, such as an interstitial pod (a time frame reserved for ancillary content, such as interstitials, wherein one or more interstitials may be needed to fill a pod, wherein an item of ancillary content may be in the form of interstitial content), determine context information (e.g., information regarding the primary content being requested, information regarding the user, and/or other context information), solicit and select interstitial content from third parties, define customized interstitials as described herein, generate playlist manifests, and/or perform other functions described herein. The streaming system 104 and/or another system may stream requested content to the requesting device 106.

Optionally, the streaming system 104 may transmit context information to one or more interstitial source systems $108_1 \ldots 108_n$. For example, the source systems $108_1 \ldots 108_n$ may optionally include ad servers, and the interstitial content may comprise ads. The interstitial source systems $108_1 \ldots 108_n$ may comply with the VAST protocol. By way of further example, the interstitial source systems $108_1 \ldots 108_n$ may provide public service videos, previews of upcoming programs, quizzes, news, games, and/or other content. The interstitial source systems $108_1 \ldots 108_n$ may use the context information in determining what interstitial content is to be provided or offered to the requesting client device 106. Optionally, as part of a decisioning process, the interstitial source systems $108_1 \ldots 108_n$ may submit bids to place interstitial content in association with primary content, and the streaming system 104 may evaluate the bids and optionally based at least in part on the bids, select one or more items to insert into an interstitial pod. The interstitial source systems $108_1 \ldots 108_n$ may be configured to receive signaling to reject the corresponding ad campaign and/or advertiser from the streaming system 104 indicating that a particular item of ancillary content, such as interstitial content, is not to be transmitted to client devices $1061 \ldots 106$, as similarly discussed elsewhere herein. The streaming system 104 may be configured to transmit closed caption messages (e.g., SEI messages) for respective video frames.

The streaming system 104 may be configured to execute processes discussed herein in whole or in part. As similarly described elsewhere herein, the streaming system 104 may be configured to identify search and/or viewing trends with respect to one or more types of entities (e.g., actors/talent, franchises, brands, directors, writers, and/or the like). For example, bi-directional CUSUM may be utilized to identify such trends, while minimizing the effects of temporary spikes on the trend analysis. The streaming system 104 may be configured to utilize the trend data to predict future streaming demands and to allocate computer resources (e.g., servers) and to perform pre-caching at CDNs to better meet streaming demands, as similarly discussed elsewhere herein. In addition, the trend data may be utilized to generate and/or acquire content associated with entities that are trending upwards. The system 104 may generate trend reports, enabling data-driven decisions for content and entity promotions, engagement strategies, and/or project planning. The trend reports may be electronically transmitted as electronic documents to one or more destinations.

Figure 2A:
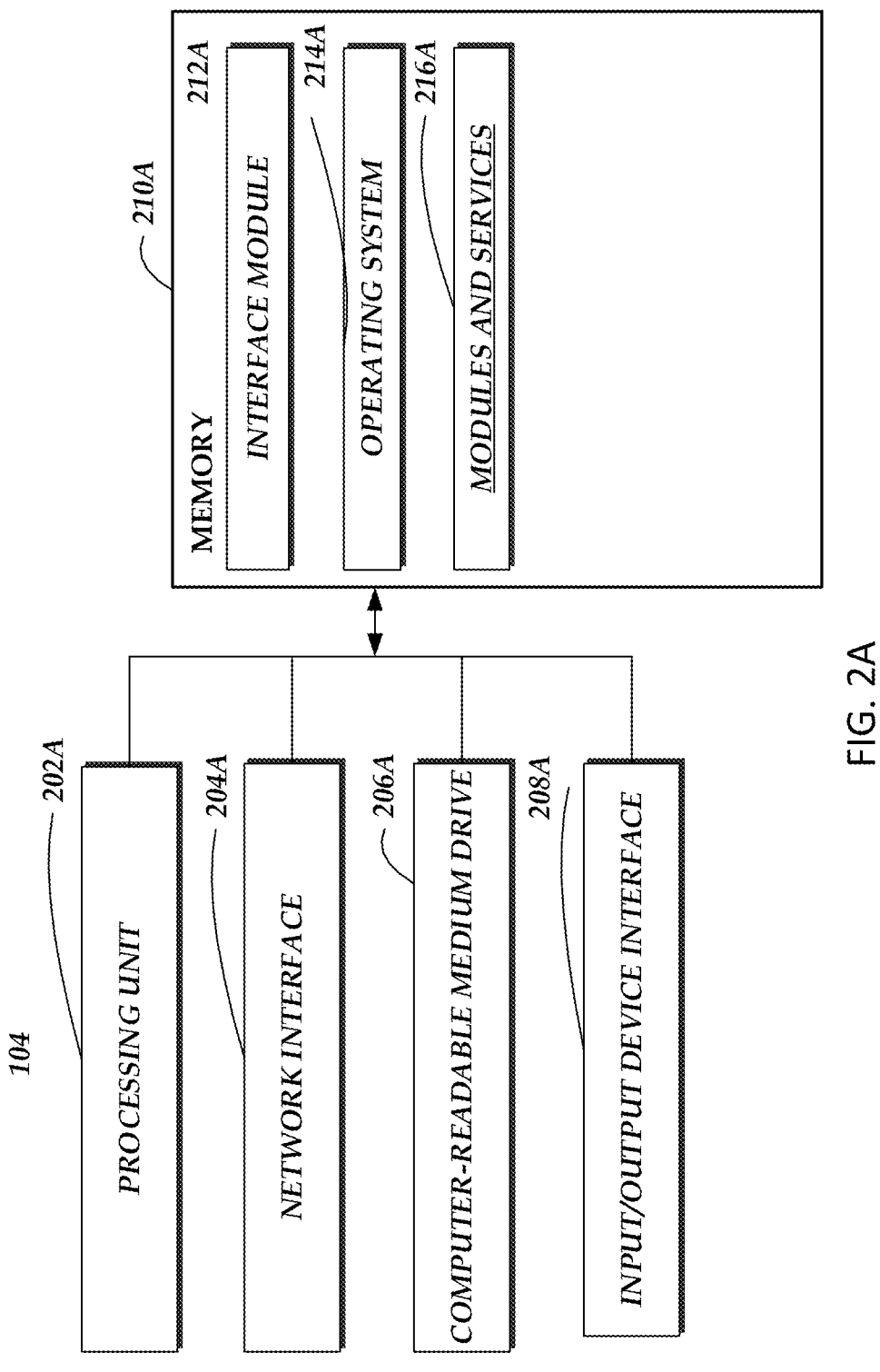
FIG. 2A is a block diagram illustrating example components.

FIG. 2A is a block diagram illustrating example components of the example streaming system 104. The example streaming system 104 includes an arrangement of computer hardware and software components that may be used to implement aspects of the present disclosure. Those skilled in the art will appreciate that the example components may include more (or fewer) components than those depicted in FIG. 2A.

The streaming system 104 may include one or more processing units 202A (e.g., a general purpose processor or artificial intelligence processor (e.g., comprising one or more arithmetic logic units, data registers, an encryption processor, a video transcoder, input/output busses, and/or a high speed graphics processor)), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks or computing systems. The processing unit 202A may thus receive information and instructions from other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more features of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In the illustrated example, the memory 210A includes an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include both a general purpose processor and a video codec. The system 104 may offload certain compute-intensive portions of the modules and services 216A (e.g., transcoding and/or transrating a stream for adaptive bitrate operations, compositing, and/or the like) to one or more dedicated devices, such as a standalone video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams).

The processing unit 202A may optionally comprise a graphics processing unit (GPU) that includes hundreds or thousands of core processors configured to process tasks in parallel. The GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring to FIG. 2B, the modules and services 216A may include modules that provide a playlist request service 202B, an interstitial selection service 204B, a playlist manifest generation service 208B, a content streaming service 210B, a trend detection service 212B, a computer resource allocation service 214B, a content generation and acquisition service 216B, and an LLM service 218B.

The playlist request service 202B may receive and process requests for playlist manifests. The interstitial selection service 204B may assemble context information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source and/or decisioning systems. The interstitial source and/or decisioning systems may propose interstitial content to the interstitial selection service 204B of the stitching system. The interstitial selection service 204B may evaluate the proposals and select one or more items of interstitial content for inclusion in the interstitial pod. The content streaming service 210B may be configured to stream video and other content, such as closed captions.

The manifest generation service 208B may be used to assemble a playlist manifest (e.g., M3U8 for HLS, MPD for DASH) including locators (e.g., URLs) pointing to segments and sections of primary and interstitial content and locators (e.g., URLs), organized to correspond to the desired playback sequence. The manifest file may list the available bitrate versions and their corresponding segments. The manifest file informs the client video player about the structure of the stream and how to access each segment. For example, the manifest may be transmitted over a network to a client (e.g., a browser or dedicated streaming application) on a user device. The client may then request a given item of content (e.g., section or segment) as needed, which may then be served by the corresponding content source or intermediary to the client.

The encoded video segments and manifest files are packaged and prepared for distribution. For example, the content may be encrypted and protected using a DRM (Digital Rights Management) system. The packaged content may be uploaded to and distributed via a Content Delivery Network (CDN) for efficient delivery to end-users.

During playback, the client-side player uses the manifest file to dynamically switch between different quality levels based on network conditions and device capabilities. This ensures a smooth viewing experience with minimal buffering.

The trend detection service 212B may detect search and/or viewing trends for entities (e.g., actors/talent, franchises, brands, writers, directors, and/or the like). For example, as similarly discussed elsewhere herein, enhanced CUSUM may be implemented via the trend detection service 212B. By way of illustration, bi-directional tracking may optionally be performed, wherein deviations in entity searches and/or content viewing in both positive and negative directions are tracked. A spike period may be identified when the spike starts with a positive deviation followed by a negative adjustment. The negative CUSUM may be configured to identify a negative change where the cumulative deviation drops below a set threshold to provide accurate detection of both the start and end of spike periods. Optionally, the disclosed algorithm tracks negative changes only after a positive change has been detected, making it more relevant and precise for this context.

The computer resource allocation service 214B may access the trend data generated by the trend detection service 212B to predict demand for one or more items of content. For example, if the interest in a given actor is determined to be trending upwards as indicated by searches for the actor and/or the viewing of content in which the actor is cast, future viewing demand for content in which the actor is cast may be predicted. The predicted viewing demand may be used to determine what streaming related computer-based resources should be deployed to handle such predicted viewing demand to avoid buffering, delayed start times, and/or degraded video quality. As similarly discussed elsewhere herein, load balancers, CDNs, auto-scaling cloud infrastructure, and/or predictive caching, the streaming service can dynamically manage predicted load increases (e.g., predicted using enhanced CUSUM as described herein), ensuring high-quality performance and reducing the risk of outages or buffering for end users.

The content generation and acquisition service 216B may be used to determine what content is to be generated or acquired using the trend data generated by the trend detection service 212B. By way of example, when a determination is made that an actor is trending upwards (e.g., the number of viewers that search for information on the actor and/or view content with the actor is increasing over time), additional content with the actor may be created and/or acquired. By way of illustrative example, content may be generated using an artificial intelligence engine.

The LLM (Large Language Model) service 218B may be utilized to analyze and/or summarize the trigger events causing the spike periods. As similarly described elsewhere herein, the summary may explain the impact of these trigger events on the resulting baseline shifts, providing data regarding the factors driving changes in popularity. For example, a prompt may be provided to the large language model, instructing the large language model to generate an analysis on causes for changes in search trend baselines or search spikes, and or viewing baseline trends or search spikes for an entity using data from one or more sources.

By analyzing data associated with search and/or viewing baseline trends, and/or search and/or viewing spikes, the LLM may generate a textual and/or graphic electronic document identifying the likely events causing such changes in baseline trends and/or spikes.

Figure 3:
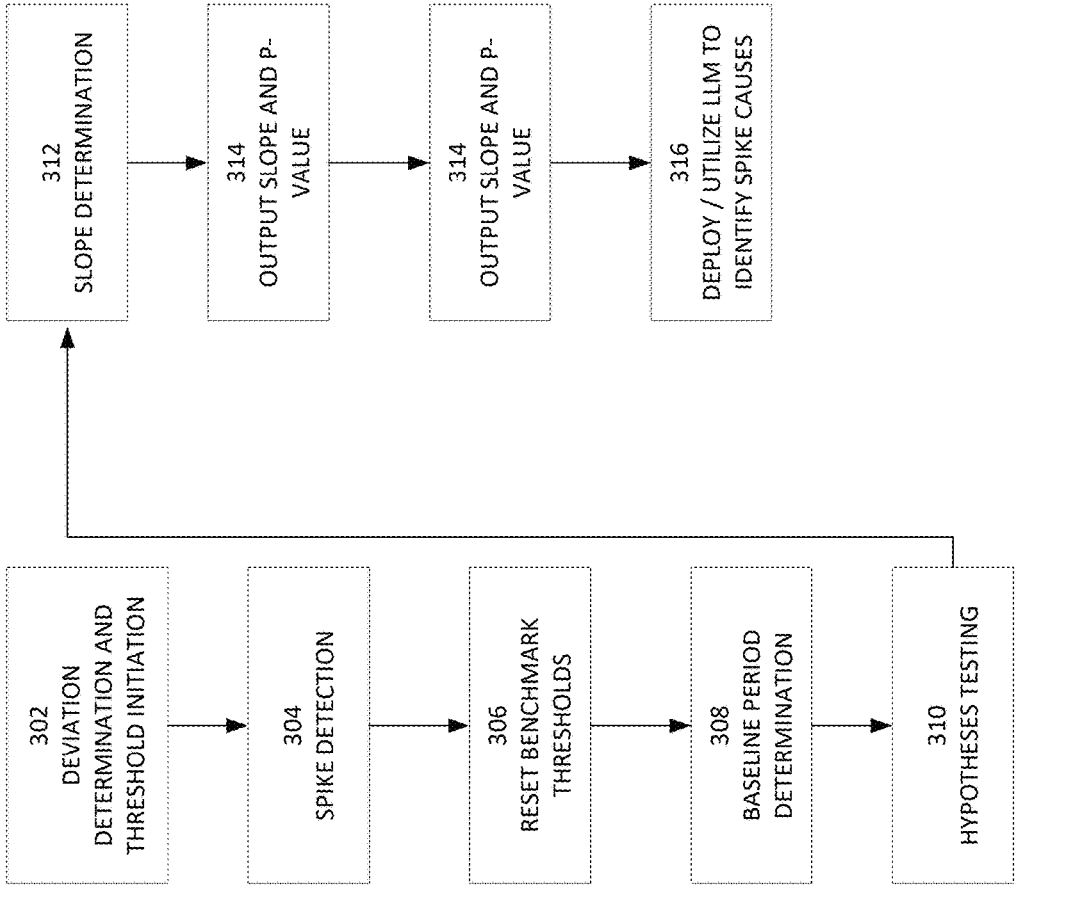
FIG. 3 illustrates an example process.

The enhanced CUSUM process will now be described with respect to FIG. 3. As similarly discussed elsewhere herein, the enhanced CUSUM algorithm tracks the cumulative deviation of search data from its norm, represented by the mean or median of a given period. The deviation at each time point is calculated as the difference between the search data at that point and the norm. The algorithm then accumulates these deviations over time to pinpoint moments when the search pattern shifts significantly away from the norm.

Bi-directional tracking may optionally be performed, wherein deviations in both positive and negative directions are tracked. A spike period may be identified when the spike starts with a positive deviation followed by a negative adjustment. The negative CUSUM may be configured to identify a negative change where the cumulative deviation drops below a set threshold to provide accurate detection of both the start and end of spike periods. Optionally, the disclosed algorithm tracks negative changes only after a positive change has been detected, making it more relevant and precise for this context. Optionally, a change/spike period currently in progress without an ending point is dropped to thereby ensure that only complete and accurate periods are considered, enhancing reliability. Optionally, if a change/spike period is determined to be too flat, indicated by significantly low variance below a set threshold (e.g., a fraction of the overall standard deviation), it is dropped. This prevents insignificant changes from affecting the analysis. Optionally, baseline periods with a sample size below a minimum required threshold number of values are dropped. This ensures that only statistically reliable baseline periods are considered for hypothesis testing.

At block 302, a deviation calculation and threshold initiation may be performed using tracked search and/or viewing data accessed from memory. As discussed elsewhere herein, such tracked search data may indicate how many searches over a given period of time were performed for the entity (e.g., actor, franchise, and/or brand) for which trends are to be determined. Similarly, such tracked viewing data may include how many views of a given entity (e.g., programs including a specific actor, programs in a franchise, programs associated with a corresponding brand) occurred for a given period of time.

At respective time points, the deviation from the norm is calculated as similarly discussed elsewhere herein. The cumulative deviation is tracked, and a threshold is set based on a multiple of the standard deviation of the data over a period. This threshold acts as a distribution-based benchmark. Optionally, different thresholds may be set for positive CUSUM and negative CUSUM.

At block 304, spike detection is performed as similarly discussed elsewhere herein. When the cumulative deviation exceeds the threshold, it indicates a significant shift from the norm, signaling the start of a spike period. The process then begins to detect deviations in the negative direction to determine when the spike period ends using negative CUSUM. Once both the start and end points of a spike period are identified, they are paired to form a complete spike period. The algorithm then resumes detecting the next positive change point to identify subsequent spike periods.

At block 306, the benchmark thresholds are reset via dynamic baseline resetting. For example, after a change is detected, parameters (e.g., S, Baseline Norm, and thresholds k and h) are reset based on the new baseline established after the detected change, where S is the cumulative sum of deviation. This adjustment improves the performance of the adapted CUSUM algorithm.

For example, when the positive S is accumulated to a certain point, the deviation is large enough to indicate a significant shift away from the norm, and a positive change is detected. Therefore, S is reset to zero, and tracking of the deviation in the negative direction is initiated, anticipating a negative shift back to the norm. Once change is detected the Baseline Norm (optionally represented by the mean or the median of the norm) is also reset. The baseline norm is reset under the assumption that underlying data distribution might change after changes. For example, the mean will be higher after a positive impact from the event triggering the change. This new baseline norm may be dynamically calculated based on the values after the change point, reflecting the new distribution. Because the data distribution is expected to change, resetting the distribution-based thresholds ensures that the algorithm remains responsive to underlying baseline changes following spikes.

Similarly, k and h may be reset adaptively, based on the values after the change. The variable "k" corresponds to the reference value threshold, or the local deviation threshold, that indicates the minimum shift size, or allowance/buffer, where deviation values less than the k threshold are filtered out as noise. The variable "h" is the accumulated deviation threshold. Both k and h are based on a fraction of standard deviation. When S surpasses h, a change is detected. This process is performed to align with the new distribution after change. For example, the data could be less volatile after a significant raise in baseline because a larger volume smooths out the fluctuation.

This contrasts with conventional CUSUM algorithms that utilize fixed baselines represented by the mean or median of the data, with thresholds based on standard deviation. Recognizing that data patterns can change after spikes, the disclosed enhanced CUSUM algorithm dynamically resets the baseline benchmarks and distribution-based thresholds after a given detected change period. This makes the CUSUM algorithm more responsive to shifts in the underlying baseline and distribution, ensuring ongoing accuracy Data distribution may vary for entities with different search volumes. Typically, smaller entities tend to have more volatile trends, while larger entities exhibit more stable trends. To optimize detection accuracy, optionally entities are categorized into different buckets (e.g., high, medium, and low buckets) based at least in part on their total search (or viewing) volume. Optionally, different parameters and thresholds are applied to respective buckets, tuned through cross-validation with identified sets of rising and non-rising entities.

Optimized parameter tuning may optionally be performed: For example, comprehensive cross-validation may be utilized to identify the best or an enhanced set of parameters for a given entity bucket. Different parameter combinations may be implemented and those that offered the highest accuracy in detecting rising entities may be selected for further use.

At block 308, baseline period identification is performed. The periods before and after the identified spike periods are identified as baseline periods. These baseline periods are stable and represent the true norm of popularity or interest, materially unaffected by the noise that would otherwise be introduced by temporary spikes.

At block 310, statistical hypothesis testing may be performed to determine if an entity's popularity is rising. For example, statistical hypothesis testing may be applied to search trend data to determine if observed patterns in search interest for a particular entity are statistically significant or if they might be due to random fluctuations.

This testing may comprise comparing the baselines before and after spike periods. Tests such as the Mann-Whitney U test or the Jonckheere-Terpstra (JT) test may be utilized to assess whether the baseline after the spike is significantly higher than the previous baseline or whether the baselines are continuously increasing in chronological order.

The Mann-Whitney U test is a non-parametric test used to compare two independent samples to determine if they come from different distributions. In this context, the Mann-Whitney U test may be used to assess whether the search trend baseline after a spike is significantly different from the baseline before the spike. A pre-spike baseline period and a post-spike baseline period may be identified. Search trend data for each of these periods may be collected, and ranks may be computed. The Mann-Whitney U test is used to compare the two distributions. If the test shows a significant difference, this indicates that the post-spike baseline is statistically different from the pre-spike baseline (either higher or lower). A significant result would indicate that the post-spike baseline is different (potentially higher) than the pre-spike baseline. This could imply a sustained increase in search interest.

The Jonckheere-Terpstra test is a non-parametric test that evaluates whether there is an ordered trend across multiple independent samples. The Jonckheere-Terpstra test can test for a monotonic trend across three or more ordered groups (e.g., periods of time). The search trend data may be divided into three or more consecutive baseline periods (e.g., monthly or weekly segments) before, during, and after the spike. The Jonckheere-Terpstra test may be used to determine if there's a significant increasing (or decreasing) trend across these time-ordered periods. A significant The Jonckheere-Terpstra test result would indicate a monotonic trend in search interest across these time segments, such as a continuous increase over time. This indicates that each baseline period has progressively higher search interest than the previous one, suggesting a sustained upward trend.

The Mann-Whitney U test may be utilized in comparing two baselines: before and after the spike. The Jonckheere-Terpstra test may be utilized to check for a consistent trend across multiple consecutive baselines, such as a gradually increasing search trend over time.

Thus, these example tests may be utilized to assess whether observed changes in search interest (or similarly viewing data) are statistically significant, which can inform decisions on whether an increase in interest is sustained or part of a natural fluctuation.

At block 312, a slope determination may be performed. The detected baselines may be used to calculate the slope, representing the magnitude of the rise in popularity. For example, Sen's Slope may be utilized to calculate the slope. Sen's Slope is a non-parametric method that may be used to estimate the slope of a trend in time series data. It is less affected by outliers and non-normal data distributions than many conventional slope calculation techniques. This ensures a reliable and accurate measure of the trend's direction and magnitude. Unlike linear regression, which is sensitive to outliers, Sen's Slope provides a robust trend estimate by taking the median of all possible slopes between data points.

To make comparisons of the slope (e.g., the extent of rise) comparable across different entity buckets, the slope may be scaled. Without scaling, higher buckets would naturally have higher slopes due to higher raw search interest. Scaling normalizes the slopes with a robust treatment of outliers, ensuring accurate comparisons across multiple buckets.

At block 314, the process outputs the p-value and the slope, indicating whether the baseline is rising and the extent of the rise. This information can be used to identify entities that are genuinely rising in popularity/searches. In Sen's Slope estimation, the p-value is optionally calculated using the Mann-Kendall test to assess whether the observed trend (indicated by the slope) is statistically significant.

In particular, the Mann-Kendall test comprises a non-parametric test that detects a monotonic upward or downward trend over time. The test may compute a test statistic S based on the difference between data points, indicating whether values generally increase or decrease. The p-value from the Mann-Kendall test indicates the probability that the observed trend could be due to random chance. A low p-value (e.g., <0.05) indicates that the trend detected by Sen's Slope is statistically significant, providing evidence that the slope is not simply due to random variability. A high p-value (e.g., p>0.05) indicates that the trend might not be significant and could be due to random fluctuations.

At block 316, the detected baselines can be deployed in other analyses and modeling tasks that need a fair and accurate metric of entity popularity. Optionally, Large Language Models (LLMs) may be utilized to analyze and/or summarize the trigger events causing the spike periods. The summary may explain the impact of these trigger events on the resulting baseline shifts, providing deeper insights into the factors driving changes in popularity. For example, a prompt may be provided to the large language model, instructing the large language model to generate an analysis on causes for changes in search trends for an entity using data from one or more sources.

Trigger events may be significant occurrences (e.g., news stories, announcements, content releases, and/or the like) that lead to a noticeable increase in public attention. By analyzing textual data associated with these spikes, the LLM may generate analysis and summaries identifying the likely events causing such spikes. For example, natural language processing techniques may be utilized to interpret context and significant information.

The LLM may comprise a transformer architecture that utilizes self-attention, which enables the model to selectively focus on different parts of the input sequence during the encoding process. The transformer architecture may comprise an encoder and a decoder, connected through one or more multi-head attention and feedforward layers.

The encoder is configured to receive an input sequence and process it using multi-head self-attention, where the input sequence is transformed into a set of query, key, and value vectors. The query, key, and value vectors may be used to compute the attention scores between given positions in the sequence, enabling the model to identify the relevant (e.g., most relevant) portions of the input sequence for respective positions.

The decoder is configured to receive the encoder output and generate an output sequence. The decoder may also utilize multi-head attention and may be further configured with an additional attention mechanism that enables the decoder to attend to the encoder output and to generate the output sequence using the relevant information from the input sequence.

The transformer architecture may comprise one or more feedforward layers, which apply a linear transformation followed by a non-linear activation function to the output of the attention layers. The feedforward layers facilitate further capture patterns in the input and output sequences.

The transformer may comprise a loss function that measures the difference between the predicted output sequence and the true output sequence. The transformer is configured to minimize or reduce the loss function output. Backpropagation may be utilized as part of the minimization process, where the gradients of the loss function with respect to the model parameters are calculated and used to update the model weights (e.g., associated with neural network layers).

The LLM may be trained. The training process may involve exposing the LLM to a very large and extensive corpus of text (e.g., articles on viewing trends, articles on search trends, news articles, social media posts, blog entries, other online content, and/or the like). Through this exposure, the model learns grammar, syntax, and semantics. Through such training, the LLM learns to predict the next word(s) in a sentence or generate entire paragraphs based on the patterns it has identified in the training data.

Optionally, the LLM may be fine-tuned via the training process to provide more accurate responses. Fine tuning may comprise supplying the LLM with a list of queries (e.g., related to identifying trends in entity searches or viewing) and desired responses.

When search and/or viewing data and/or trend data is provided to the LLM, the model utilizes its learned knowledge to provide responses based on the input it receives.

For example, during spike periods, the LLM may be instructed to pull in news articles, social media posts, blog entries, and/or other online content that correlates with the timing of these spikes. The LLM may perform keyword matching and/or topic modeling and identify relevant keywords and/or hashtags. By identifying relevant keywords and/or hashtags associated with the spike, the LLM may narrow down and identify related content.

The LLM may also use topic modeling (e.g., LDA, NMF, Top2Vec, BERTopic, and/or the like) to group together similar events or themes that appear frequently around the spike. Topic modeling comprises a machine learning technique that enables the automatic identification and grouping of words and phrases from a collection of documents into distinct topics. Topic modeling is useful for analyzing large sets of unstructured text data, such as articles, social media posts, or survey responses, to discover patterns or underlying themes. By way of example, Latent Dirichlet Allocation (LDA) is a probabilistic method that assumes documents are mixtures of topics and that topics are mixtures of words. The model identifies a distribution of topics in documents and words in topics that best explains the data. Non-negative Matrix Factorization (NMF) is a linear algebra-based approach that factorizes the term-document matrix into matrices of words by topics and documents by topics.

Topic modeling may comprise tokenization in which text is split into individual words or tokens. Stopwords removal may be performed, wherein (e.g., "a," "and", "the", and/or the like) that do not materially contribute to topics are removed. Stemming/Lemmatization may be performed, wherein words may be reduced to their root forms (e.g., "watching" to "watch") to avoid treating similar words as different words. Vectorization may be performed, wherein the prepared text data is transformed into a numerical representation. Optionally, a "term frequency-inverse document frequency" (TF-IDF) matrix may be utilized to capture the frequency of words across documents.

A given topic may be represented by a list of keywords. The keywords may be analyzed to interpret the theme or label of each topic.

Based on the topic distribution, a given document may be assigned to one or multiple topics.

Event detection may be performed, wherein the LLM may detect notable events by looking for specific patterns in text, such as named entities (e.g., names of people/actors/characters, brands, franchises, or locations) and verbs indicating events (e.g., "announced," "launched," "canceled"). This detection may be enhanced by focusing on temporal indicators to link events with the time period of the spike.

Sentiment analysis may be performed, wherein detected sentiment changes may help identify moments of public reaction. For example, a spike in positive or negative sentiment within the relevant time frame can indicate a trigger event that had an emotional impact, which is often a driver of search spikes.

Automatic summarization of the trigger event(s) may be generated by the LLM. Optionally key details of events may be summarized (e.g., in 1 to 10 sentences). For example, given multiple articles on an actor, the LLM may condense these articles into a short description of the actor, events that recently occurred related to the actor (e.g., new movie release with the actor, a new romantic partner of the actor, a crime report related to the actor, etc.)

By comparing multiple spikes, the LLM may generate summaries for similar trigger events, identifying recurring themes (e.g., celebrity news, movie releases, reviews, and/or the like) or unique factors driving certain spikes, adding context to the summaries.

Automated reporting and insights generation may be performed. For example, event attribution may be performed, wherein the LLM may attribute spikes to specific events by ranking events by relevance or importance based on keyword frequency, sentiment, or semantic similarity to previous events.

Optionally, summaries are tailored to specific audiences (e.g., marketers, researchers, schedulers, etc.) by focusing on relevant aspects of a trigger event, such as economic impact, public reaction, or media coverage.

In addition, the detected baselines and changes thereto may optionally be utilized to determine placement of content (e.g., thumbnail images corresponding to available streaming content) on a home page or other pages of a streaming service (e.g., user interfaces display images and/or text corresponding to a content library). Optionally, the detected baselines and changes thereto, and/or the LLM-generated analysis and summary may be utilized to determine what content to acquire or generate. For example, if the detected baselines and changes thereto, and/or the LLM-generated analysis and summary indicate that interest in an actor is trending upwards at greater than a threshold slope, a decision may be made to create and/or acquire content where the actor plays a leading role.

Thus, by synthesizing information from various sources, the LLM may accurately identify and explain trigger events for spike periods, making complex trends more accessible and actionable based on the momentum of momentum of rising entities (e.g., actors/talent, franchises, brands, and/or the like) the cause of spikes and rising baselines. Such spike and/or baseline data may, for example, enable top rising talent (e.g., the top 5, 10, or 20 actors whose popularity is trending up the most) to be identified via a report to a talent casting team. By way of further example, such spike and/or baseline data for entities may enable viewing and ticket sales (e.g., for movies that are to be screened in theaters) to be better forecast. In addition, such spike and/or baseline data for a franchise (e.g., a film/movie series comprising a collection of related films in succession that share the same fictional universe, or are marketed as a series) may be utilized to tell which franchise is on the rise, as to measure franchise strength.

An aspect of the present disclosure relates to a system, comprising: at least one processing device; non-transitory memory storing programmatic code that when executed by the at least one processing device, cause the system to: monitor searches related to a first entity; determine a first baseline with respect to a mean or median quantity of searches for the first entity over given time periods; detect a spike with respect to a quantity of searches for the first entity; determine a second baseline with respect to a mean or median quantity of searches for the first entity after the detected spike; determine whether the second baseline is greater than a threshold difference from the first baseline; at least partly in response to determining that the second baseline is greater than the threshold difference from the first baseline, determine that a change in interest has occurred with respect to the first entity; and at least partly in response to determining that the change in interest has occurred with respect to the first entity, change a deployment of computer resources comprising a change in a number of streaming servers used to stream content related to the first entity.

Optionally, the system is configured to: track a first cumulative deviation of search quantities of searches for the first entity from the first baseline in a first direction; determine a first threshold using a multiple of a standard deviation of the search quantities of searches for the first entity from the first baseline over a first period; determine whether the first cumulative deviation of search quantities of searches for the first entity from the first baseline in the first direction exceeds the first threshold; at least partly in response to determining that the first cumulative deviation exceeds the first threshold, determine that a spike period has begun; track a second cumulative deviation of search quantities of searches for the first entity from the first baseline in a second direction; determine a second threshold using a multiple of a standard deviation of the search quantities of searches for the first entity from the second baseline over a second period; determine whether the second cumulative deviation exceeds the second threshold; at least partly in response to determining that the second deviation exceeds the second threshold, determine that a spike period ending has begun; and reset the first and second thresholds in response to a detected change period;

Optionally, the system is configured to: provide data regarding the first baseline, the second baseline, and the detected spike to a large language model; provide data regarding the first entity from a plurality of sources to the large language model; provide a prompt to the large language model configured to cause the large language model to generate an analysis as to a cause of the spike and the change from the first baseline to the second baseline; generate an electronic document comprising an output from the large language model generated at least in part in response to the prompt; and transmit the electronic document over a network to one or more destinations.

Optionally, the system is configured to initiate a load balancing operation at least partly in response to determining that the change in interest has occurred with respect to the first entity. Optionally, the system is configured to change a placement of an item of content on a content library page at least partly in response to determining that the change in interest has occurred with respect to the first entity. Optionally, the system is configured to initiate a creation of content related to the first entity at least partly in response to determining that the change in interest has occurred with respect to the first entity. Optionally, the system is configured to determine a slope between the first baseline and the second baseline and use the slope in determining the change in interest.

An aspect of the present disclosure relates to a computer-implemented method comprising: monitoring searches related to a first entity; determining a first search baseline with respect to a mean or median quantity of searches for the first entity over given time periods; detecting a spike with respect to a quantity of searches for the first entity; determining a second baseline with respect to a mean or median quantity of searches for the first entity after the detected spike; determining whether the second baseline is greater than a threshold difference from the first baseline; at least partly in response to determining that the second baseline is greater than the threshold difference from the first baseline, determining that a change in interest has occurred with respect to the first entity; at least partly in response to determining that the change in interest has occurred with respect to the first entity, changing a deployment of computer resources comprising a change in a number of streaming servers used to stream content related to the first entity and/or causing at least in part new content related to the first entity to be obtained.

Optionally, the method further comprises: tracking a first cumulative deviation of search quantities of searches for the first entity from the first baseline in a first direction; determining a first threshold using a multiple of a standard deviation of the search quantities of searches for the first entity from the first baseline over a first period; determining whether the first cumulative deviation of search quantities of searches for the first entity from the first baseline in the first direction exceeds the first threshold; at least partly in response to determining that the first cumulative deviation exceeds the first threshold, determining that a spike period has begun; tracking a second cumulative deviation of search quantities of searches for the first entity from the first baseline in a second direction; determining a second threshold using a multiple of a standard deviation of the search quantities of searches for the first entity from the second baseline over a second period; determining whether the second cumulative deviation exceeds the second threshold; at least partly in response to determining that the second deviation exceeds the second threshold, determining that a spike period ending has begun; and resetting the first and second thresholds in response to a detected change period;

Optionally, the method further comprises: providing data regarding the first baseline, the second baseline, and the detected spike to a large language model; providing data regarding the first entity from a plurality of sources to the large language model; providing a prompt to the large language model configured to cause the large language model to generate an analysis as to a cause of the spike and the change from the first baseline to the second baseline; generating an electronic document comprising an output from the large language model generated at least in part in response to the prompt; and transmitting the electronic document over a network to one or more destinations.

Optionally, the method further comprises initiating a load balancing operation at least partly in response to determining that the change in interest has occurred with respect to the first entity. Optionally, the method further comprises changing a placement of an item of content on a content library user interface at least partly in response to determining that the change in interest has occurred with respect to the first entity. Optionally, the method further comprises initiating a creation of content related to the first entity at least partly in response to determining that the change in interest has occurred with respect to the first entity. Optionally, the method further comprises determining a slope between the first baseline and the second baseline and use the slope in determining the change in interest.

An aspect of the present disclosure relates to a non-transitory memory that stores instructions that when executed by a computer system causes the computer system to perform operations comprising: monitor searches and/or content views related to a first entity; determine a first baseline with respect to a mean or median quantity of searches and/or content views for the first entity over given time periods; detect a spike with respect to a quantity of searches and/or content views for the first entity; determine a second baseline with respect to a mean or median quantity of searches and/or content views for the first entity after the detected spike; determine whether the second baseline is greater than a threshold difference from the first baseline; at least partly in response to determining that the second baseline is greater than the threshold difference from the first baseline, determine that a change in interest has occurred with respect to the first entity; and at least partly in response to determining that the change in interest has occurred with respect to the first entity, change a deployment of computer resources comprising a change in a number of streaming servers used to stream content related to the first entity, and/or initiate acquisition of items of content related to the first entity.

Optionally, the operations further comprise: track a first cumulative deviation of search quantities of searches for the first entity from the first baseline in a first direction; determine a first threshold using a multiple of a standard deviation of the search quantities of searches for the first entity from the first baseline over a first period; determine whether the first cumulative deviation of search quantities of searches for the first entity from the first baseline in the first direction exceeds the first threshold; at least partly in response to determining that the first cumulative deviation exceeds the first threshold, determine that a spike period has begun; track a second cumulative deviation of search quantities of searches for the first entity from the first baseline in a second direction; determine a second threshold using a multiple of a standard deviation of the search quantities of searches for the first entity from the second baseline over a second period; determine whether the second cumulative deviation exceeds the second threshold; at least partly in response to determining that the second deviation exceeds the second threshold, determine that a spike period ending has begun; and reset the first and second thresholds in response to a detected change period;

Optionally, the operations further comprise: provide data regarding the first baseline, the second baseline, and the detected spike to a large language model; provide data regarding the first entity from a plurality of sources to the large language model; provide a prompt to the large language model configured to cause the large language model to generate an analysis as to a cause of the spike and the change from the first baseline to the second baseline; generate an electronic document comprising an output from the large language model generated at least in part in response to the prompt; and transmit the electronic document over a network to one or more destinations.

Optionally, the operations further comprise: initiate a load balancing operation at least partly in response to determining that the change in interest has occurred with respect to the first entity. Optionally, the operations further comprise: change a placement of an item of content on a content library user interface at least partly in response to determining that the change in interest has occurred with respect to the first entity. Optionally, the operations further comprise: initiating a creation of content related to the first entity at least partly in response to determining that the change in interest has occurred with respect to the first entity. Optionally, the operations further comprise: determine a slope between the first baseline and the second baseline and use the slope in determining the change in interest.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and may be used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
at least one processing device;
non-transitory memory storing programmatic code that when executed by the at least one processing device, cause the system to:
monitor searches related to a first entity;
determine a first baseline with respect to a mean or median quantity of searches for the first entity over given time periods;
detect a spike with respect to a quantity of searches for the first entity;
determine a second baseline with respect to a mean or median quantity of searches for the first entity after the detected spike;
determine whether the second baseline is greater than a threshold difference from the first baseline;
at least partly in response to determining that the second baseline is greater than the threshold difference from the first baseline, determine that a change in interest has occurred with respect to the first entity; and
at least partly in response to determining that the change in interest has occurred with respect to the first entity, change a deployment of computer resources comprising a change in a number of streaming servers used to stream content related to the first entity.

2. The system as defined in claim 1, wherein the system is configured to:
track a first cumulative deviation of search quantities of searches for the first entity from the first baseline in a first direction;
determine a first threshold using a multiple of a standard deviation of the search quantities of searches for the first entity from the first baseline over a first period;
determine whether the first cumulative deviation of search quantities of searches for the first entity from the first baseline in the first direction exceeds the first threshold;
at least partly in response to determining that the first cumulative deviation exceeds the first threshold, determine that a spike period has begun;
track a second cumulative deviation of search quantities of searches for the first entity from the first baseline in a second direction;
determine a second threshold using a multiple of a standard deviation of the search quantities of searches for the first entity from the second baseline over a second period;
determine whether the second cumulative deviation exceeds the second threshold;
at least partly in response to determining that the second deviation exceeds the second threshold, determine that a spike period ending has begun; and
reset the first and second thresholds in response to a detected change period.

3. The system as defined in claim 1, wherein the system is configured to:
provide data regarding the first baseline, the second baseline, and the detected spike to a large language model;

provide data regarding the first entity from a plurality of sources to the large language model;

provide a prompt to the large language model configured to cause the large language model to generate an analysis as to a cause of the spike and the change from the first baseline to the second baseline;

generate an electronic document comprising an output from the large language model generated at least in part in response to the prompt; and transmit the electronic document over a network to one or more destinations.

4. The system as defined in claim 1, wherein the system is configured to initiate a load balancing operation at least partly in response to determining that the change in interest has occurred with respect to the first entity.

5. The system as defined in claim 1, wherein the system is configured to change a placement of an item of content on a content library page at least partly in response to determining that the change in interest has occurred with respect to the first entity.

6. The system as defined in claim 1, wherein the system is configured to initiate a creation of content related to the first entity at least partly in response to determining that the change in interest has occurred with respect to the first entity.

7. The system as defined in claim 1, wherein the system is configured to determine a slope between the first baseline and the second baseline and use the slope in determining the change in interest.

8. A computer-implemented method comprising:

monitoring searches related to a first entity;

determining a first search baseline with respect to a mean or median quantity of searches for the first entity over given time periods;

detecting a spike with respect to a quantity of searches for the first entity;

determining a second baseline with respect to a mean or median quantity of searches for the first entity after the detected spike;

determining whether the second baseline is greater than a threshold difference from the first baseline;

at least partly in response to determining that the second baseline is greater than the threshold difference from the first baseline, determining that a change in interest has occurred with respect to the first entity;

at least partly in response to determining that the change in interest has occurred with respect to the first entity, changing a deployment of computer resources comprising a change in a number of streaming servers used to stream content related to the first entity and/or causing at least in part new content related to the first entity to be obtained.

9. The computer-implemented method as defined in claim 8, the method further comprising:

tracking a first cumulative deviation of search quantities of searches for the first entity from the first baseline in a first direction;

determining a first threshold using a multiple of a standard deviation of the search quantities of searches for the first entity from the first baseline over a first period;

determining whether the first cumulative deviation of search quantities of searches for the first entity from the first baseline in the first direction exceeds the first threshold;

at least partly in response to determining that the first cumulative deviation exceeds the first threshold, determining that a spike period has begun;

tracking a second cumulative deviation of search quantities of searches for the first entity from the first baseline in a second direction;

determining a second threshold using a multiple of a standard deviation of the search quantities of searches for the first entity from the second baseline over a second period;

determining whether the second cumulative deviation exceeds the second threshold;

at least partly in response to determining that the second deviation exceeds the second threshold, determining that a spike period ending has begun; and resetting the first and second thresholds in response to a detected change period.

10. The computer-implemented method as defined in claim 8, the method further comprising:

providing data regarding the first baseline, the second baseline, and the detected spike to a large language model;

providing data regarding the first entity from a plurality of sources to the large language model;

providing a prompt to the large language model configured to cause the large language model to generate an analysis as to a cause of the spike and the change from the first baseline to the second baseline;

generating an electronic document comprising an output from the large language model generated at least in part in response to the prompt; and transmitting the electronic document over a network to one or more destinations.

11. The computer-implemented method as defined in claim 8, the method further comprising initiating a load balancing operation at least partly in response to determining that the change in interest has occurred with respect to the first entity.

12. The computer-implemented method as defined in claim 8, the method further comprising changing a placement of an item of content on a content library user interface at least partly in response to determining that the change in interest has occurred with respect to the first entity.

13. The computer-implemented method as defined in claim 8, the method further comprising initiating a creation of content related to the first entity at least partly in response to determining that the change in interest has occurred with respect to the first entity.

14. The computer-implemented method as defined in claim 8, the method further comprising determining a slope between the first baseline and the second baseline and use the slope in determining the change in interest.

15. Non-transitory memory that stores instructions that when executed by a computer system causes the computer system to perform operations comprising:

monitor searches and/or content views related to a first entity;

determine a first baseline with respect to a mean or median quantity of searches and/or content views for the first entity over given time periods;

detect a spike with respect to a quantity of searches and/or content views for the first entity;

determine a second baseline with respect to a mean or median quantity of searches and/or content views for the first entity after the detected spike;

determine whether the second baseline is greater than a threshold difference from the first baseline;

at least partly in response to determining that the second baseline is greater than the threshold difference from the first baseline, determine that a change in interest has occurred with respect to the first entity; and at least partly in response to determining that the change in interest has occurred with respect to the first entity, change a deployment of computer resources comprising a change in a number of streaming servers used to stream content related to the first entity, and/or initiate acquisition of items of content related to the first entity.

16. The non-transitory memory as defined in claim 15, the operations further comprising:

track a first cumulative deviation of search quantities of searches for the first entity from the first baseline in a first direction;

determine a first threshold using a multiple of a standard deviation of the search quantities of searches for the first entity from the first baseline over a first period;

determine whether the first cumulative deviation of search quantities of searches for the first entity from the first baseline in the first direction exceeds the first threshold;

at least partly in response to determining that the first cumulative deviation exceeds the first threshold, determine that a spike period has begun;

track a second cumulative deviation of search quantities of searches for the first entity from the first baseline in a second direction;

determine a second threshold using a multiple of a standard deviation of the search quantities of searches for the first entity from the second baseline over a second period;

determine whether the second cumulative deviation exceeds the second threshold;

at least partly in response to determining that the second deviation exceeds the second threshold, determine that a spike period ending has begun; and reset the first and second thresholds in response to a detected change period.

17. The non-transitory memory as defined in claim 15, the operations further comprising:

provide data regarding the first baseline, the second baseline, and the detected spike to a large language model;

provide data regarding the first entity from a plurality of sources to the large language model;

provide a prompt to the large language model configured to cause the large language model to generate an analysis as to a cause of the spike and the change from the first baseline to the second baseline;

generate an electronic document comprising an output from the large language model generated at least in part in response to the prompt; and transmit the electronic document over a network to one or more destinations.

18. The non-transitory memory as defined in claim 15, the operations further comprising: initiate a load balancing operation at least partly in response to determining that the change in interest has occurred with respect to the first entity.

19. The non-transitory memory as defined in claim 15, the operations further comprising: change a placement of an item of content on a content library user interface at least partly in response to determining that the change in interest has occurred with respect to the first entity.

20. The non-transitory memory as defined in claim 15, the operations further comprising initiating a creation of content related to the first entity at least partly in response to determining that the change in interest has occurred with respect to the first entity.

21. The non-transitory memory as defined in claim 15, the operations further comprising: determine a slope between the first baseline and the second baseline and use the slope in determining the change in interest.

* * * * *